US007001286B2

(12) United States Patent
Kim et al.

(10) Patent No.: US 7,001,286 B2
(45) Date of Patent: Feb. 21, 2006

(54) GOLF BALL HAVING THIN INTERMEDIATE LAYER AND METHODS OF MANUFACTURE

(75) Inventors: Hyun Jin Kim, Carlsbad, CA (US); Dean A. Snell, Oceanside, CA (US); Eric Loper, Costa Mesa, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 149 days.

(21) Appl. No.: 10/189,218

(22) Filed: Jul. 1, 2002

(65) Prior Publication Data

US 2003/0022734 A1 Jan. 30, 2003

Related U.S. Application Data

(63) Continuation-in-part of application No. 09/678,477, filed on Oct. 2, 2000, now abandoned.

(51) Int. Cl.
*A63B 37/06* (2006.01)

(52) U.S. Cl. ........................................................ 473/374

(58) Field of Classification Search ................ 473/373, 473/374, 377, 376, 357, 367, 368, 370, 371, 473/354

See application file for complete search history.

(56) References Cited

U.S. PATENT DOCUMENTS

| | | | | |
|---|---|---|---|---|
| 5,816,943 | A | 10/1998 | Masutani et al. | 473/365 |
| 6,012,991 | A * | 1/2000 | Kim et al. | 473/374 |
| 6,315,682 | B1 * | 11/2001 | Iwami et al. | 473/374 |
| 6,520,871 | B1 * | 2/2003 | Sullivan et al. | 473/374 |

FOREIGN PATENT DOCUMENTS

| | | |
|---|---|---|
| EP | 0 577 058 A1 | 1/1994 |
| EP | 0 601 861 A1 | 6/1994 |
| GB | 2 278 609 A | 12/1994 |
| GB | 2 320 439 A | 6/1998 |
| WO | WO 98/43709 | 10/1998 |
| WO | WO 99/20354 | 4/1999 |
| WO | WO 99/54001 | 10/1999 |
| WO | WO 00/41773 | 7/2000 |

* cited by examiner

*Primary Examiner*—Raeann Gorden
(74) *Attorney, Agent, or Firm*—Sheppard, Mullin, Richter & Hampton LLP

(57) ABSTRACT

A golf ball has a thin intermediate layer, within specified thickness and hardness, situated between a ball core and cover layer. The thin intermediate layer provides for a ball having superior ball spin performance without loss of ball speed. Particular compositions for the intermediate layer, along with methods for spray-coating of a ball core, compression molding over a ball core, and grinding down of a thick intermediate layer that are particularly suited for making this thin intermediate layer, also are disclosed.

14 Claims, 1 Drawing Sheet

GOLF BALL HAVING THIN INTERMEDIATE LAYER AND METHODS OF MANUFACTURE

This application is a continuation-in-part (CIP) of prior application No.: 09/678,477 filed Oct. 2, 2000, now abandoned.

BACKGROUND OF THE INVENTION

The invention relates generally to a golf ball and, more specifically, to a golf ball incorporating an intermediate layer designed to improve ball performance. The invention also relates to methods of making such golf balls.

Golf balls generally have a core and at least one cover layer surrounding the core. Balls can be classified as two-piece, wound, or multi-layer balls. Two-piece balls include a spherical inner core generally made from rubber and an outer cover layer. Two-piece balls generally have high durability and good ball speed when hit, leading to good ball distance. However, these balls also generally have low spin rates, which results in poor ball controllability. High spin rate is a desirable property of golf balls, particularly for advanced players who can take particular advantage of the improved controllability of balls exhibiting high spin. Two-piece balls also provide poor "feel," or overall sensation transmitted to the golfer while hitting the ball. Wound balls generally include a core, a rubber thread wound under tension around the core to a desired diameter, and a cover layer, typically of balata material. Wound balls generally provide high spin, and therefore greater controllability, than two-piece balls, and they also generally provide superior feel. However, these balls generally have a relatively low coefficient of restitution (C.O.R.), which leads to reduced ball speed and therefore distance, and also are less durable than two-piece balls.

A good way to optimize the requirements of good speed, spin, feel, and durability is through a multi-layer construction. Multi-layer balls include a core, a cover layer, and one or more intermediate layers situated between the core and the cover layer. U.S. Pat. No. 6,012,991 to Kim et al. discloses a multi-layer golf ball having good distance, feel, and spin. Multi-layer balls generally have performance characteristics between those of two-piece and wound balls; that is, multi-layer balls exhibit distance and durability inferior to two-piece balls but superior to wound balls, and they exhibit feel and spin rate inferior to wound balls but superior to two-piece balls. In particular, use of an intermediate layer to improve spin rate often can lead to substantial loss of ball speed, and therefore distance. In particular, balls preferably should exhibit high spin rate when hit by an iron for enhanced controllability of short- and medium-distance shots, but the balls preferably should exhibit lower spin rate when hit by a driver to maximize distance for long shots. Therefore, efforts have been focused in designing intermediate layers for golf balls on producing layers that provide high spin rate without loss of ball distance or durability. These efforts have not met with complete success.

In view of the above, there remains a need for golf balls having intermediate layers that provide for high spin rate without substantial loss of ball speed and distance. The present invention fulfills this need and provides several related advantages.

SUMMARY OF THE INVENTION

The present invention resides in a golf ball having a core, a cover layer, and a soft, thin intermediate layer placed over a solid surface between the core and the cover layer made from an elastomeric material, and having: a thickness of from about 0.1 to about 1.0 mm, more preferably from about 0.1 to about 0.77 mm, more preferably from about 0.1 to about 0.65 mm, and most preferably from about 0.1 to about 0.33 mm; and, a shore A hardness of from about 30 to about 100, more preferably from about 45 to about 100, and most preferably from about 60 to about 100. In preferred embodiments of the invention, the elastomeric material includes: an amide block copolymer, more preferably a polyether amide block copolymer; a polyester elastomer or polyether ester elastomer; a polyurethane; a polyester/polyolefin blend; styrenic copolymer, styrenic terpolymer, or mixtures of these; or, a block copolymer having at least one polymer block comprising an aromatic vinyl compound and at least one polymer block comprising a conjugated diene compound, and having a hydroxyl group at the terminal block copolymer, or its hydrogenation product.

Another embodiment of the invention resides in a golf ball having a core, intermediate layer, and cover layer, in which the intermediate layer is situated over the solid surface of a core and includes a polyether amide block copolymer and has a thickness of about 0.3 mm. The cover layer preferably includes an ionomer and either an amide block copolymer or a block copolymer having at least one polymer block comprising an aromatic vinyl compound and at least one polymer block comprising a conjugated diene compound, and having a hydroxyl group at the terminal block copolymer, or its hydrogenation product.

An additional embodiment of the invention resides in a golf ball having a core, intermediate layer, and cover layer, in which the intermediate layer is situated over the solid surface of a core and includes a block copolymer having at least one polymer block comprising an aromatic vinyl compound and at least one polymer block comprising a conjugated diene compound, and having a hydroxyl group at the terminal block copolymer, or its hydrogenation product, and has a thickness of about 0.5 mm. The cover layer preferably includes an ionomer and either an amide block copolymer or a block copolymer having at least one polymer block comprising an aromatic vinyl compound and at least one polymer block comprising a conjugated diene compound, and having a hydroxyl group at the terminal block copolymer, or its hydrogenation product.

Particular embodiments of the golf balls of the present invention include: cores comprising inner and one or more outer cores; liquid or paste cores; a layer of rubber thread between the core and the cover layer; and, additional intermediate layers between the core and the cover layer.

The invention also resides in a method for placing a thin elastomeric layer over a golf ball core by spray-coating a coating material onto the golf ball core, the layer having a thickness of from about 0.1 to about 1.0 mm, more preferably from about 0.1 to about 0.77 mm, more preferably from about 0.1 to about 0.65 mm, and most preferably from about 0.1 to about 0.33 mm. The spray-coating is preferably achieved using a charged spray gun system, particularly a corona or tribo-charging gun system. In preferred embodiments of the invention, the coating material includes powder or liquid material. When the coating material includes powder material, the method includes a step of melting the powder material onto the core. Additionally, the method may include a step of applying a conductive primer to the surface of the core before the step of spray-coating.

The invention additionally resides in a method for placing a thin elastomeric layer over a golf ball core by placing a thicker layer onto a golf ball core, and then grinding down the intermediate layer until it has a of from about 0.1 to about 1.0 mm, more preferably from about 0.1 to about 0.77 mm, more preferably from about 0.1 to about 0.65 mm, and most preferably from about 0.1 to about 0.33 mm. The invention also resides in a method for placing a thin elastomeric layer over a golf ball core by compression-molding the thin layer over the core.

BRIEF DESCRIPTION OF THE DRAWING

Other advantages and characteristics of the invention will be better understood upon reading the description that follows and with reference to the annexed single FIGURE of drawing illustrating, by way of example, a golf ball according to the invention, including, in the illustrated example, a core, an intermediate layer, and a cover layer.

DESCRIPTION OF THE PREFERRED EMBODIMENT

Figure 1:
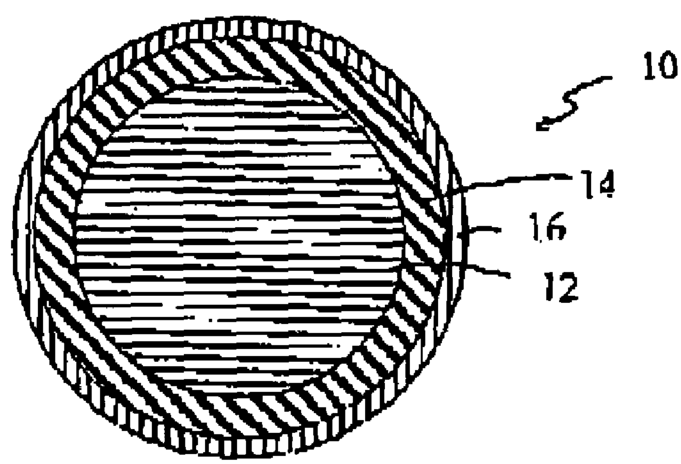

As shown in the illustrative FIGURE, the invention is embodied in a golf ball 10 having a core 12, intermediate layer 14, and a cover 16. The intermediate layer is thin and elastomeric, and allows for improved spin rate without loss of ball speed. The invention also resides in a method of making such an intermediate layer. It has been determined that a thin elastomeric intermediate layer, thinner than those generally used in golf balls, provides particular advantages in golf ball properties. Such a layer can be included in a golf hail to improve the ball's spin rate with little or no loss of speed in the resulting golf ball. The present invention involves a thin intermediate layer made from elastomeric material having thickness from 0.1 to 1.0 mm, more preferably from 0.1 to 0.77 mm, and most preferably from 0.1 to 0.65 mm. The intermediate layer has a hardness from about 30 to about 100 on the Shore A scale, more preferably from about 45 to about 100, and most preferably from about 60 to about 100. One or more of these thin intermediate layers having different compositions may be included in a golf ball to optimize particular properties.

Elastomers that are particularly suitable for use in thin intermediate layers of the present invention include amide block copolymers, such as those marketed under the trade name PEBAX by Elf Atochem of Puteaux, France. Another particularly suitable elastomer is a block polymer having at least one polymer block comprising an aromatic vinyl compound and at least one polymer block comprising a conjugated diene compound, and having a hydroxyl group at the terminal block copolymer, or its hydrogenated product. An example of this polymer is sold under the trade name HG-252 by Kuraray Company of Kurashiki, Japan. Other particularly suitable elastomers include polyether elastomer, as well as polyether ester elastomer, such as that marketed under the trade names HYTREL by E.I. DuPont de Nemours & Company, and SKYPEL by S.K. Chemicals of Seoul, South Korea. Another particularly suitable elastomer is polyurethane, such as that marketed under the trade names SKYTHANE by S.K. Chemicals, and ESTANE by B.F. Goodrich Company of Cleveland, Ohio. Other particularly suitable elastomers include ionomers, such as those marketed under the trade name SURLYN E.I. DuPont de Nemours & Co. Also, polyester/polyolefin blends are particularly suitable for use in the thin layers of the present invention. Additionally, styrenic copolymers and terpolymers are particularly suitable for use in thin layers of the present invention. Examples of styrenic copolymers are resins manufactured by Shell chemicals under the trade names KRATON D (for styrene-butadiene-styrene and styrene-isoprene-styrene types) and KRATON G (for styrene-ethylene-butylene-styrene and styrene-ethylene-propylene-styrene types). Examples of randomly distributed styrenic polymers include paramethylstyrene-isobutylene (isobutene) copolymers developed by Exxon Mobil Corporation.

Additional examples of suitable elastomers include polyester thermoplastic urethane, polyether thermoplastic urethane, copolyetherester elastomer, copolyesterester elastomer, polyamide elastomer, olefinic elastomer, ethylene-vinyl acetate copolymers, ethylene-octene copolymer, rubber-based copolymer, cyclic olefin copolymer, and olefinic thermoplastic elastomer. Examples of olefinic thermoplastic elastomers include blends of polyolefins having ethyl-propylene-nonconjugated diene terpolymer, rubber-based copolymer, and dynamically vulcanized rubber-based copolymer. Examples of these include products sold under the trade names SANTOPRENE, DYTRON, VISAFLEX, and VYRAM by Advanced Elastomeric Systems of Akron, Ohio, and SARLINK by DSM of Haarlen, the Netherlands.

Examples of rubber-based copolymers include multiblock rubber-based copolymers, particularly those in which the rubber block component is based on butadiene, isoprene, or ethylene/butylene. The non-rubber repeating units of the copolymer may be derived from any suitable monomers, including meth(acrylate) esters, such as methyl methacrylate and cyclohexylmethacrylate, and vinyl arylenes, such as styrene.

Examples of copolyester elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of an aromatic polyester and an aliphatic polyester also may be used for these. Examples of these include the HYTREL and SKYPEL products discussed above.

Examples of thermoplastic elastomers suitable for use in the present invention include those having functional groups, such as carboxylic acid, maleic anhydride, glycidyl, norbonene, and hydroxyl. An example of these includes the HG-252 product discussed above. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; bromonated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

Examples of polyamide elastomers include polyether amide elastomers, such as polyether amide block copolymer. Examples of these include the PEBAX product discussed above. Mixtures of all of the above-mentioned resins also can be used in the present invention, as can many other known types of polymer.

Three different methods of manufacture are used to make intermediate layers for golf balls: thin-wall injection molding, a combination of injection and compression molding, and dipping. Injection molding involves placing mold-halves over a ball core, leaving a thin cavity. The intermediate layer material is injected into the cavity under pressure to form the intermediate layer. Combination compression/injection molding involves preparing the intermediate layer as two hemispheres by injection molding, and then placing the two hemispheres around the core. The hemispheres are then heated and placed under pressure to bond the hemispheres into a single layer on the core. Dipping involves simply dipping the core into a suitable liquid material to provide a coating. Dipping, however, presents problems of controlling thickness of the layer produced because of material sagging due to gravity, and also from material dripping from the ball during manufacture. These thickness problems are exacerbated in trying to produce a thin layer. Dipping also produces substantial waste material and mess, making disposal and clean-up costs high.

One method for preparing the thin intermediate layer of the present invention is by use of liquid spray coating, powder spray coating or a combination of these. Using spray coating methods, it is possible to make a thin intermediate layer with good homogeneity and without the greater expense associated with use of compression and injection molding. Spray coating also allows for increased flexibility in selection of materials used for the layer over dipping, because the material sprayed can be in power or liquid for, while injection and compression molding necessitate use of a liquid material.

This combination of thinness, lack of variation in thinness, and ease of processing are difficult to achieve by conventional methods commonly used to make these intermediate layers. By using a spray coating method, it is possible to design a golf ball with a superior intermediate layer, and therefore improved performance. Also, the method can be used to produce a golf ball comprising a number of chemically and/or mechanically different intermediate layers, by using multiple applications with different coating materials.

A wide variety of conventional spraying equipment can be used for liquid and powder spray material. However, to enhance spraying efficiency during the process, use of a spraying gun is preferred. In particular, charged spray coating systems are well-suited for preparation of these thin layers. For example, a corona gun system may be used, such as the SURE COAT Manual spray gun system marketed by Nordson Corporation of Westlake, Ohio. Another manufacturer of corona gun systems is Mitsuba Systems of Maharashtra, India. A corona gun system uses voltage to supply a charge to the coating material. The coating material is pumped from the feed hopper through a hose to the tip of the spray gun by the delivery system. A charging electrode at the gun tip is connected to a high voltage generator. High voltage is discharged from the gun tip to create a highly ionized corona field that will charge the coating material as it travels through the field. The coating material acquires a charge while traveling from the gun through the corona field, and therefore it is attracted to a grounded end. Voltage, nozzle type, pressures, and position can be adjusted to deliver the coating material to suit a wide variety of intermediate layers.

Another charged spray coating system suitable for use in the present invention is a tribo-charging gun. One suitable tribo-charging gun is the TRIBOMATIC II, marketed by Nordson Corporation. Another suitable tribo-charging gun is the OMEGA III marketed by Red Line Industries of Bombay, India. In a tribo-charging gun, the coating material is charged by frictional contact with the inside of the gun body. A mixture comprising coating material and air enters the gun and passes through a tubular section that is made of a material know to be a good acceptor of electrons, such as Teflon. As the particles of coating material with the walls of the tube, they pick up a positive charge by giving up electrons to the tube, causing the tube to become negatively charged. This negative charge is then passed from the gun barrel to ground through a cable. Either of the above-described charged spray methods can be made more efficient by use of a laser targeting device, which is known in spray-coating applications.

Either thermoplastic or thermoset coating materials can be used in preparation of the intermediate layer using a spray coating system. These coating materials can be in liquid or powder form. As discussed above, these materials preferably will have hardness from about 30 to about 90 on the Shore A scale when solidified or cured. Possible coating materials include monomers, dimers, trimers, oligomers, and polymers with or without reactive functional groups that can be crosslinked by using thermal, radiative, or laser energy, or a combination of these.

Examples of powder polymer coating materials for use with spray coating systems include: acrylic, epoxy, polyester, urethane, vinyl-ether, polyester maleate vinyl ether, methacrylate, polyamides, polyolefins, polyvinylchloride, polyvinyldiene fluoride, polyester urethane, acrylic urethane, silicones, melamines, glyco-urils, hydroxy alkyl amides, epoxy/polyester hybrid, polyester-carboxyl, and polyester-hydroxyl. Other polymers known in the art also can be used as coating materials.

Examples of monomer coating materials for use with spray coating systems include: polyols, cyanates, cyclohexyl acrylate, tetrahydrofurfuryl acrylate, ethoxyethoxyethyl acrylate, phenoxyethyl acrylate, isobornyl acrylate, N-vinyl-2-pyrrolidone, N-isobutoxymethyl acrylamide, 1,6-hexandiol diacrylate, glycol diacrylate, tetraethylene glycol diacrylate, tetradecyl acrylate, pentadecyl acrylate, hexadecyl acrylate, octadecyl acrylate, trifluoroethyl acrylate, ethoxylated nonyl phenol acrylate, 2,2,2-trifluoroethyl methacrylate, tris (2-hydroxyethyl isocyanurate triacrylate, ethoxy ethyl methacrylate, hydroxy ethyl methacrylate, 3-phenoxy-2-hydroxylpropyl methacrylate, 2-methacryloxyethyl phenyl urethane, m-phenylene dimaleimide, 4-vinylanisole, ethoxylated trimethyolpropane, and propoxylated trimethyolpropane. Besides these, other monomers known in the art also can be used as coating materials.

Examples of oligomer coating materials include: epoxy acrylates, such as bisphenol-A epoxy diacrylate, bisphenol-A epoxy dimethacrylate, and aliphatic alkyl diacrylate; urethane acrylate, such as aliphatic or aromatic difunctional, trifunctional, or hexafunctional urethane acrylate; polyester acrylate, such as difunctional, trifunctional, or hexafunctional polyester acrylate; silicone- or fluorine-modified acrylate; and melamine acrylate. Besides these, other oligomers known in the art also can be used as coating materials.

Additionally, to facilitate application of a thin intermediate layer comprised of a charged coating material when using a spray coating system, a conductive primer can be applied on the surface of the core to improve conductivity prior to applying the liquid or powder coating material. If a powder coating material has been sprayed to form the thin intermediate layer, the coated layer must next be melted onto the core. Whether powder or liquid coating material has been used, the coating layer also must be cured to be an effective intermediate layer. Curing involves inducing crosslinking in the coating materials by forming covalent bonds. Curing results in increased cut resistance, scuff resistance, and surface hardness of the cover layer. Melting or curing of coating material can be performed in-line with or off-line from the spraying process. If a thermoset material is used, the sprayed layer can be cured using conventional thermal curing by exposure to convection heat or infrared, as is commonly used in the manufacture of golf balls. The sprayed layer also can be cured using an electron beam (EB) or ultraviolet radiation (UV) curing process, or any combination of these.

Another method suitable for preparing thin intermediate layers of the present invention is by grinding down a thicker layer to a suitable thinness. In the method, a thick intermediate layer of within the above-specified hardness range is applied to the surface of a core using conventional methods, such as compression molding and injection molding, or using spray coating. The layer then is ground down until it is of a thickness within the scope of the present invention. The process of grinding down can be performed using equipment known for grinding down ball cores and other spherical objects, such as a centerless grinder or a tumbling grinder. The particular equipment used should be selected to provide an evenly ground surface, preventing variation in the remaining intermediate layer material. Also, the intermediate layer should be kept from heating excessively, to prevent melting and deformation of the intermediate layer. This can be achieved by using several passes in the grinding machine, each of short duration, until the intermediate layer has been ground to sufficient thinness.

The golf balls of the present invention can incorporate multiple core layers, liquid- or paste-filled cores, wound cores, one or more thicker intermediate layers, or a combination of these. In particular, spray coating of a thin intermediate layer onto a wound core avoids the particular difficulties involved in making a wound core with a uniform thin layer due to the uneven core surface and irregularities in the resulting intermediate layer. In addition to the polymers discussed above, the material used in the thin intermediate layers of the invention also can contain pigment, plasticizer, extenders, flow and leveling aids, solvents, adhesion promoters, flatting agents, wetting agents, slip aids, UV stabilizer, antioxidant, optical brightener, and other additives commonly used in golf ball layers.

EXAMPLE

Golf balls were prepared having thin intermediate layers within the scope of the present invention using compression and injection molding. First, half cups were prepared from elastomeric material using injection molding. Next, the half-cups were used to form an intermediate layer on a golf ball core using compression molding, as discussed above. Intermediate layers of different thicknesses within the scope of the invention were molded onto ball cores, incorporating either: PEBAX 2533, a polyether amide block copolymer marketed by Elf Atochem; or HG-252, the block copolymer discussed above, marketed by Kuraray Company. The hardnesses of the PEBAX 2533 and HG-252 intermediate layers were roughly 75 and 80 on the Shore A scale, respectively. A cover layer incorporating 30% PEBAX 2533 and 70% SURLYN 6120, an ionomer marketed by E.I. DuPont de Nemours & Co., was injection-molded over each intermediate layer. Besides this combination, another preferred polymer blend for covers for use in balls incorporating the thin layers of the present invention includes ionomer and a block copolymer such as the HG-252 material. Finally, a primer coat and topcoat was placed over each cover layer.

For comparison, balls also were made having either no intermediate layer, or having intermediate layers of thickness outside the scope of the invention. All of the balls prepared were tested for spin rate and speed when hit with an 8-iron and with a driver. The intermediate layer compositions and thickness, along with the spin rate performances, are shown in Table 1 below. The results are identified by separately-numbered data. Type 1 balls include those having intermediate layers thicker than those of the present invention. Type 2 and 4 balls include those having the soft, thin intermediate layers of the present invention prepared incorporating the HG-252 and PEBAX 2533 materials, respectively. Type 3 and 5 balls include those having no intermediate layers prepared as comparison to ball types 2 and 4, respectively.

TABLE 1

| Type | Interm. Layer Material | Interm. Layer Thickness mm | 8-Iron spin rpm | 8-Iron speed ft/sec | Driver spin rpm | Driver speed rpm |
|---|---|---|---|---|---|---|
| 1 | HG-252 | 1.33 | 8663 | 109.2 | 3258 | 157.5 |
| 2 | HG-252 | 0.55 | 7812 | 108.7 | 2799 | 159.1 |
| 3 | None | N/A | 7569 | 108.7 | 2679 | 159.3 |
| 4 | Pebax 2533 | 0.31 | 7885 | 108.9 | 2820 | 158.6 |
| 5 | None | N/A | 7430 | 108.8 | 2799 | 159.5 |

The result of the testing indicate the advantageous properties of the balls of the present invention. Type 1 balls provide for higher 8-iron spin rate than Type 3 and 5 balls, but at the cost of much lower driver speed. Therefore, improved controllability of the balls is achieved at the expense of ball distance. In contrast, Type 2 and 4 balls exhibit good 8-iron spin rate, far above that exhibited by Type 3 and 5 balls, but they have comparable driver speed to Type 3 and 5 balls. Therefore, the thin intermediate layers of the present invention incorporated into Type 2 and 4 balls leads to increased 8-iron spin rate, for improved control for short- and medium-distance shots, and also high driver speed, for good distance for long-distance shots. The soft, thin intermediate layers of the present invention allow for an optimization of these normally opposing properties.

Although the invention has been disclosed in detail with reference only to the preferred embodiments, those skilled in the art will appreciate that additional soft, thin layers on golf ball cores and methods of preparing a soft, thin intermediate layer for a golf ball can be made without departing from the scope of the invention.

We claim:

1. A golf ball comprising a core, a cover layer on the outer surface of the golf ball, and an intermediate layer between the core and the cover layer, wherein the intermediate layer is situated immediately over a solid surface, comprises an elastomeric material, and has a thickness of from about 0.1 to about 1.0 mm and a Shore A hardness of from about 30 to about 100, wherein the elastomeric material comprises a block copolymer having at least one polymer block comprising an aromatic vinyl compound and at least one polymer block comprising a conjugated diene compound and having a hydroxyl group at a terminal block copolymer, or its hydrogenation product.

2. A golf ball as defined in claim 1, wherein the intermediate layer has a thickness of from about 0.1 to about 0.77 mm.

3. A golf ball as defined in claim 2, wherein the intermediate layer has a thickness of from about 0.1 to about 0.65 mm.

4. A golf ball as defined in claim 3, wherein the intermediate layer has a thickness of from about 0.1 to about 0.33 mm.

5. A golf ball as defined in claim 1, wherein the intermediate layer has a Shore A hardness of from about 45 to about 100.

6. A golf ball as defined in claim 6, wherein the intermediate layer has a Shore A hardness of from about 60 to about 100.

7. A golf ball as defined in claim 1, wherein the core comprises an inner core and a plurality of outer cores encasing the inner core.

8. A golf ball as defined in claim 1, further comprising a layer of rubber thread situated between the core and the intermediate layer.

9. A golf ball as defined in claim 1, further comprising a plurality of additional intermediate layers situated between the core and the cover layer.

10. A golf ball comprising a core, an intermediate layer situated immediately over a solid surface of the core, and an outer cover layer, wherein the intermediate layer comprises a polyether amide block copolymer and has a thickness of about 0.3 mm, and wherein the cover layer comprises an amide block copolymer and an ionomer.

11. A golf ball comprising a core, an intermediate layer situated immediately over a solid surface of the core, and an outer cover layer, wherein the intermediate layer comprises a polyether amide block copolymer and has a thickness of about 0.3 mm, and wherein the cover layer comprises: a block copolymer having at least one polymer block comprising an aromatic vinyl compound and at least one polymer block comprising a conjugated diene compound and having a hydroxyl group at a terminal block copolymer, or its hydrogenation product; and an ionomer.

12. A golf ball comprising a core, an intermediate layer situated immediately over a solid surface of the core, and an outer cover layer, wherein the intermediate layer comprises a block copolymer having at least one polymer block comprising an aromatic vinyl compound and at least one polymer block comprising a conjugated diene compound and having a hydroxyl group at a terminal block copolymer, or its hydrogenation product, and the intermediate layer has a thickness of about 0.5 mm.

13. A golf ball as defined in claim 12, wherein the cover layer comprises an amide block copolymer and an ionomer.

14. A golf ball as defined in claim 12, wherein the cover layer comprises: a block copolymer having at least one polymer block comprising an aromatic vinyl compound and at least one polymer block comprising a conjugated diene compound and having a hydroxyl group at a terminal block copolymer, or its hydrogenation product; and an ionomer.

* * * * *

UNITED STATES PATENT AND TRADEMARK OFFICE

CERTIFICATE OF CORRECTION

PATENT NO. : 7,001,286 B2
APPLICATION NO. : 10/189218
DATED : February 21, 2006
INVENTOR(S) : Kim et al.

It is certified that error appears in the above-identified patent and that said Letters Patent is hereby corrected as shown below:

Column 3,
Line 22, after “core 12,” insert -- an --.
Line 30, “hail” should be -- ball --.

Column 9,
Line 19, “claim 6” should be -- claim 5 --.

Signed and Sealed this

Twenty-seventh Day of June, 2006

JON W. DUDAS
*Director of the United States Patent and Trademark Office*